Patented Nov. 20, 1951

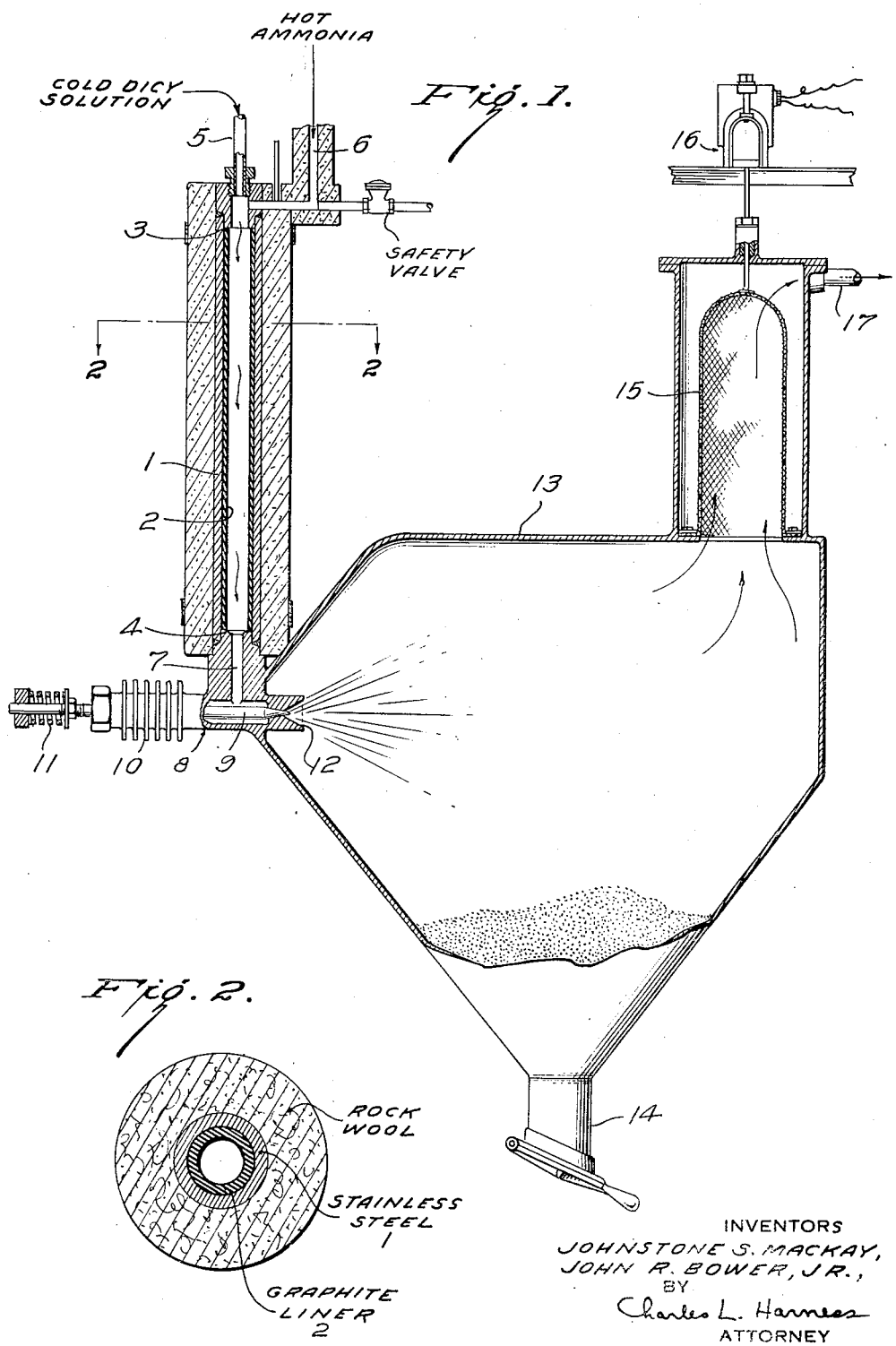

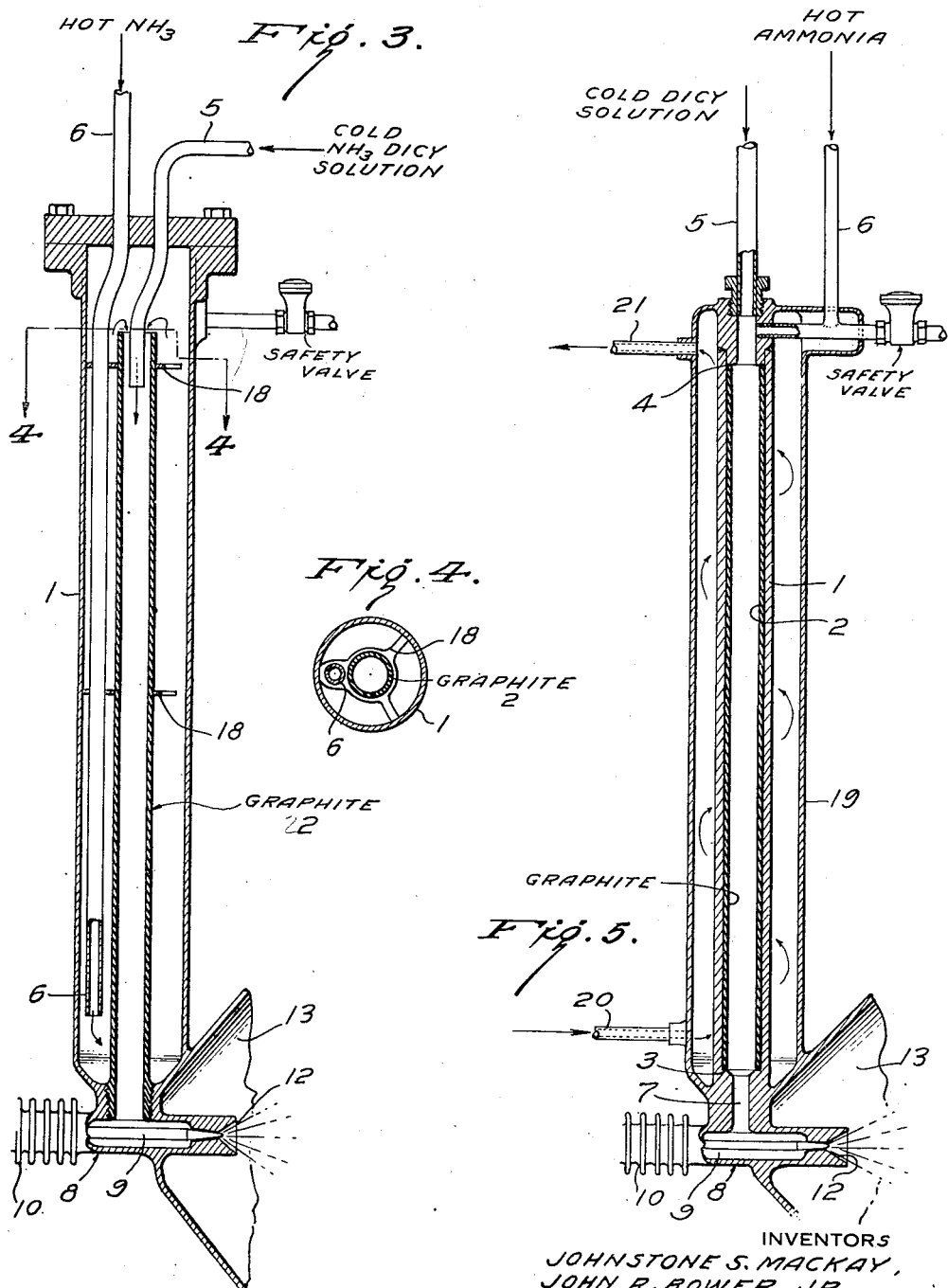

2,575,497

UNITED STATES PATENT OFFICE 2,575,497

GRAPHITE REACTION TUBE LINER FOR HIGH-TEMPERATURE MELAMINE PLANT

Johnstone S. Mackay, Old Greenwich, and John R. Bower, Jr., Stamford, Conn., assignors to American Cyanamid Company, New York, N. Y., a corporation of Maine Application March 26, 1951, Serial No. 217,685

5 Claims. (Cl. 260—249.7)

This invention relates to an improvement in the art of preparing melamine, and more particularly to the preparation of melamine in a high temperature reaction tube.

The high temperature method of making melamine is an important one, but suffers from a disadvantage that the melamine-forming material, such as dicyandiamide, urea, or the like, generally dissolved in liquid ammonia, tends to corrode the interior of the reaction tube at the high temperatures necessary to form melamine by this method, resulting in a short life of the reaction tube and impurities in the melamine produced. In the high temperature processes, it is normal to use temperatures within the range 350°-600° C. and ammonia pressures of 100-10,000 p. s. i., or even higher. Under such stringent conditions the attack on the lining of reaction tubes in normal use is severe. For example, it has been found that reaction tubes of stainless steel, platinum, and silver, are quickly corroded and that non-metallic surfaces such as borosilicate glass, ceramic liners, and glazed metals, were corrosion resistant but failed owing to thermal shock.

It is an object of this invention to provide a reaction tube for melamine production more suitable than the tubes heretofore used. It is a further object to provide a more durable reaction tube relatively free from corrosion and shock under the conditions obtaining in high temperature processes for making melamine. It is a still further object to provide a rapid and continuous process for making a high purity melamine.

It has now been found that a liner consisting of compressed graphite may be used to contain the reaction, and that the liner so used is both corrosion-resistant and not susceptible to thermal shock. The graphite may be either synthetic or natural, but must be relatively pure and must be relatively free from organic binders. The latter requirement is particularly important, because graphite liners containing organic binders fail quickly when used in the process of this invention.

Two advantages over the customary stainless steel reaction tube liners immediately accrue through the use of a graphite reaction tube liner, namely, much longer runs between shutdowns for repairs to the reaction tube, and a purer grade of melamine.

To describe the invention in greater particularity, reference is made to the accompanying drawings.

Fig. 1 is a side elevation with parts cut away, showing a graphite lined reaction tube with accessory apparatus for making melamine.

Fig. 2 shows a cross section of the reaction tube of Fig. 1 across the line 2—2.

Fig. 3 is a side elevation in section showing an additional embodiment of the graphite reaction tube, involving its external and internal heating by hot ammonia.

Fig. 4 shows a cross section of the tube assembly of Fig. 3 across the line 4—4.

Fig. 5 is a side elevation in section of a further embodiment of the graphite reaction tube that permits either external or internal heating or both.

In Fig. 1 is shown a tube 1 of steel or other metal resistant to high temperature and pressure, insulated by rock wool or the like. Tube 1 contains inserted within it graphite liner 2 held in place by stops 3 and 4. Entry ducts are shown at 5 and 6 for a cold melamine-forming solution and hot ammonia respectively. Melamine vapor formed within the reaction tube passes through the lower tube terminus 7. A conventional pressure release valve is shown generally at 8 with valve stem 9. Sylphon 10 controlled by spring 11, adjustable to cause the valve stem to unseat at any predetermined pressure, and valve orifice 12. Valve orifice 12 discharges into collecting chamber 13 equipped with gate 14 for the discharge of solids and bag filter 15 for the separation of solids for effluent gases. The bag filter is agitated by a vibrator shown generally at 16. The solids-free gases are led off through pipe 17 for storage or recycling.

Fig. 3 shows a further modification of the invention. A tube 1 of stainless steel or other metal resistant to high temperature and pressure inclosures within it an axially aligned graphite tube 2, the two tubes being separated sufficiently for the insertion of the entry tube 6 for hot ammonia. Graphite tube 2 and hot ammonia entry tube 6 are held in position by supports 18. Unheated melamine-forming solution enters the reaction tube 2 through entry duct 5. The valve shown generally at 8 is identical to the one shown in Fig. 1, comprising namely valve stem 9, Sylphon 10, spring for adjusting Sylphon (not shown) and orifice 12. Only part of the discharge chamber 13 is shown, but same is to be understood connected to a solids discharge outlet and a vapor filter as shown in Fig. 1.

A further embodiment of the invention is shown in Fig. 5. In that figure, at 1, is shown a tube of stainless steel or other metal resistant to high temperatures and pressures, enclosing a liner 2 of compressed graphite held in place by stops 3 and 4. Entry ducts are shown at 5 and 6 for a cold melamine-forming solution and hot ammonia respectively. This tube assembly is jacketed by chamber 19 of stainless steel or the like equipped with ports 20 and 21 for the circulation of a heat transfer medium such as a lead alloy or the like, and so providing an additional means of heating the reaction zone. Melamine vapor formed within the reaction tube 2, together with residual ammonia vapor, passes through terminal tube 7 through pressure release valve 8 and into collecting chamber 13 as in Figs. 1 and 3. Collecting chamber 13 is equipped with the various accessories (not shown) that accompany it in Fig. 1.

The process will now be described in more detail, with particular reference to Fig. 1, which represents a preferred embodiment of the invention.

Employing the apparatus of Fig. 1, ammonia and a substance which forms melamine when heated is passed through inlet pipe 5 into tube 2, along with hot ammonia introduced through pipe 6. The ammonia is heated by means of a pre-heater (not shown) to a temperature within the range 400°–600° C. (optimum about 500°–550° C.), and serves to heat the melamine-forming substance to a temperature at which melamine is formed. A preferred melamine-forming substance is dicyandiamide because of the speed with which it is converted into melamine under the conditions of this process. However, urea may be used instead of dicyandiamide. If urea is used, the tube 1 with its graphite liner 2 should be somewhat longer, inasmuch as the conversion of urea to melamine requires a longer period of time. Other melamine-forming substances that may be used in addition to dicyandiamide and urea include cyanamide, guanylurea, cyanourea, biuret, guanidine and its salts, cyanuric acid, ammelide ammeline, melam, meiem, melon, and others well known in the art.

The length and diameter of the reaction tube and its graphite liner will naturally vary with the nature of the melamine-forming substance and the required capacity of the plant. When using melamine-forming substances such as dicyandiamide which are almost instantly converted into melamine at the high temperatures of the process, the tube may be rather short, one successful conversion tube and its graphite liner being only thirty inches long. The tube may be much longer, however, since melamine vapors are quite stable under the conditions of the process. When using urea, melam, and other substances that form melamine more slowly at the higher temperatures, the tube and graphite liner may be longer or the rate at which these materials are passed through it may be slower. When using urea, for example, under the preferred conditions most of the urea is converted to melamine in less than about five minutes.

Still referring to Fig. 1, the following is an example using dicyandiamide in the apparatus shown. The graphite liner used was 3 feet long x 1¾ inches inner diameter, the shell being ⅜ inch thick. The liner was supported by a steel shell ½ inch thick. A solution of dicyandiamide in liquid ammonia comprising 50% of each by weight, having a temperature of about 25° C., was passed into inlet 5 at a rate of 17 lbs. of solution per hour. Ammonia preheated to 570° C. was forced into inlet tube 6 at the rate of 35.7 lbs. per hour. Equilibrium pressure within the tube was measured at 1100 lb./sq. in. The average retention time of material within the tube was about 12 seconds. Temperature of material leaving the tube through outlet 7 was about 385° C. Recovery was approximately 97–98% and the melamine purity was about 98.7%.

As shown in Fig. 1, the reaction tube is vertical. When using dicyandiamide or other melamine-forming substances which are rapidly converted to melamine at temperatures of the process, it has been found that a vertically positioned tube is preferable, there being less danger of having the tube plugged with solid melamine which may be formed below 350° C. as the dicyandiamide becomes heated. When using urea as the melamine-forming substance and other materials which form melamine more slowly and at higher temperatures, the reaction tube may be inclined horizontally or at an angle. If desired, the tube may be bent as, for example, in the shape of a U-tube.

Referring again to Fig. 1, it has been found that melamine is converted almost at the instant of its formation into melamine vapor. Said vapor along with any ammonia and other inert gases that may be accidently or purposely introduced into the reaction tube is withdrawn from the reaction vessel through the orifice of valve 8. Upon application of a predetermined pressure in the reaction chamber, the valve opens with sufficient clearance to allow the vapors to escape from the reaction vessel and yet maintain therein the pressure necessary to keep the melamine in the reaction tube from decomposing. Preferably the discharge orifice 12 is tapered as shown, although this is not necessary.

The vapors from the discharge nozzle 12 can be discharged into a cyclone separator or other suitable means of condensing the melamine vapor, and separating solid melamine from ammonia and other gases that may accompany it. One such device comprises a relatively large chamber 13 into which the vapors can discharge, and the melamine condenses therein as a finely-divided solid. Preferably the collector has a cone-shaped bottom so that the powdered melamine may be easily removed by gravity through gate 14 as shown. Various other collection means are suitable, for example, substituting a series of valves for gate 14 in order to have access to melamine collected during operation of the reaction tube without loss of too much ammonia.

The ammonia and other uncondensed vapors that may be present in the collector are separated from suspended melamine dust preferably by passing them through a bag filter 15, which is of sufficiently fine mesh to retain the solid melamine, yet permit the uncondensed vapors to pass through. The ammonia and other gases present are removed through line 17 and taken away for recovery and recycling or for any other purpose desired.

Referring now to Fig. 3, an alternate arrangement of the graphite liner for the reaction tube is shown. In this figure it will be noted that the graphite liner 2 is positioned at the center of tube 1, which is preferably formed of stainless steel. Perforated structural supports 18 hold the graphite liner in place within the tube 1 while at the same time permit the flow of hot ammonia through inlet tube 6 to circulate around the outside of the liner 2 and then to flow into the interior of the liner along with the relatively cool melamine-forming substance entering through inlet tube 3.

Fig. 5 shows a further embodiment of the invention in which the supporting tube 1, which may be of stainless steel or the like, with the graphite liner 2, is heated from without by a jacket 19, through which any desired heating media such as lead alloys may be passed. Additional heat is available by passing in hot ammonia through inlet pipe 6, and of course if desired said ammonia can supply the sole heat, giving in effect an apparatus like that of Fig. 1 except that it is uninsulated.

The preferred temperature range for operating the invention is 350°–500° C. and the preferred pressure range 750–5000 p. s. i., and still more preferably, about 2000 p. s. i.

While the invention has been described with particular reference to specific embodiments, it is to be understood that it is not to be limited thereto but is to be construed broadly and restricted solely by the scope of the appended claims.

This is a continuation-in-part of applicants' co-pending Serial No. 81,449, filed March 15, 1949, now abandoned.

We claim:

1. In the process of making melamine comprising continuously passing a melamine-forming substance through a reaction zone in a tube maintained at a temperature within the approximate range of 350°–600° C., and under a pressure of at least 100 p. s. i., the improvement which comprises passing said melamine-forming substance through a tube whose inner surface is graphite.

2. The process according to claim 1 in which the melamine-forming substance is dicyandiamide and the pressure is ammonia pressure.

3. The process according to claim 1 in which the melamine-forming substance is urea and the pressure is ammonia pressure.

4. In the process of making melamine comprising continuously passing dicyandiamide through a reaction zone in a tube maintained at a temperature within the approximate range of 350°–600° C., and under a pressure within the approximate range of 750–2000 lb./sq. in., the improvement which comprises passing said dicyandiamide through a tube whose inner surface is graphite.

5. In the process of making melamine comprising continuously passing urea through a reaction zone in a tube maintained at a temperature within the approximate range of 350°–600° C., and under a pressure within the approximate range 750–2000 lb./sq. in., the improvement which comprises passing said urea through a tube whose inner surface is graphite.

JOHNSTONE S. MACKAY.
JOHN R. BOWER, Jr.

No references cited.